United States Patent [19]

McCormick

[11] 4,251,599
[45] Feb. 17, 1981

[54] FERROUS METAL BODY COATED WITH AN ALLOY FORMED BY AN IRON/SILICON EXTENDED MOLYBDENUM PLASMA SPRAY POWDER

[75] Inventor: Harold McCormick, Ballwin, Mo.

[73] Assignee: Ramsey Corporation, St. Louis, Mo.

[21] Appl. No.: 69,250

[22] Filed: Aug. 23, 1979

Related U.S. Application Data

[63] Continuation of Ser. No. 879,477, Feb. 21, 1978, abandoned.

[51] Int. Cl.³ .............................. B22F 5/02; B05B 7/20
[52] U.S. Cl. .................... 428/682; 75/0.5 R;
75/0.5 B; 75/0.5 BA; 75/123 J; 75/123 L;
75/255; 277/235 A; 427/34; 427/191; 427/423;
427/427; 428/937
[58] Field of Search ............ 75/0.5 R, 0.5 B, 0.5 BA,
75/255, 123 J, 123 L; 427/423, 427, 34, 191;
428/682, 937; 277/235 A

[56] References Cited

U.S. PATENT DOCUMENTS

| | | | |
|---|---|---|---|
| 2,124,877 | 7/1938 | Flanders | 75/123 J |
| 2,219,462 | 10/1940 | Wissler | 75/123 J X |
| 2,289,365 | 7/1942 | Jerabek | 75/123 L |
| 2,354,147 | 7/1944 | Scott | 75/124 |
| 2,383,969 | 9/1945 | Howerton | 75/126 C X |
| 3,161,948 | 12/1964 | Bechtold | 75/123 J |
| 3,428,442 | 2/1969 | Yurasko | 75/123 J |
| 3,655,365 | 4/1972 | Holtz | 75/123 J |
| 3,690,686 | 9/1972 | Prasse et al. | 277/235 A |
| 3,819,384 | 6/1974 | Ingham et al. | 75/0.5 BA X |
| 3,856,478 | 12/1974 | Iwata et al. | 75/123 J X |
| 3,938,814 | 2/1976 | Cromwell | 277/235 A |
| 3,988,119 | 10/1976 | Takahashi et al. | 277/235 A X |
| 3,991,240 | 11/1976 | Harrington et al. | 427/423 |

FOREIGN PATENT DOCUMENTS 2433814  1/1976 Fed. Rep. of Germany.

OTHER PUBLICATIONS

Gray and Ductile Iron Castings Handbook, 1971 Chapter 3, pp. 93-94.

*Primary Examiner*—L. Dewayne Rutledge
*Assistant Examiner*—W. G. Saba

[57] ABSTRACT

There is provided an improved plasma spray powder composition for producing bearing surface alloy on a metal substrate, e.g. cast iron, said powder being characterized by the presence therein of a substantial amount of iron, molybdenum and a relatively small amount of silicon. Carbon may also desirably be present in the powder. When plasma sprayed, these powders yield a coating on a metal substrate, e.g. a cast iron piston ring, which is wear and scuff resistant.

3 Claims, 8 Drawing Figures

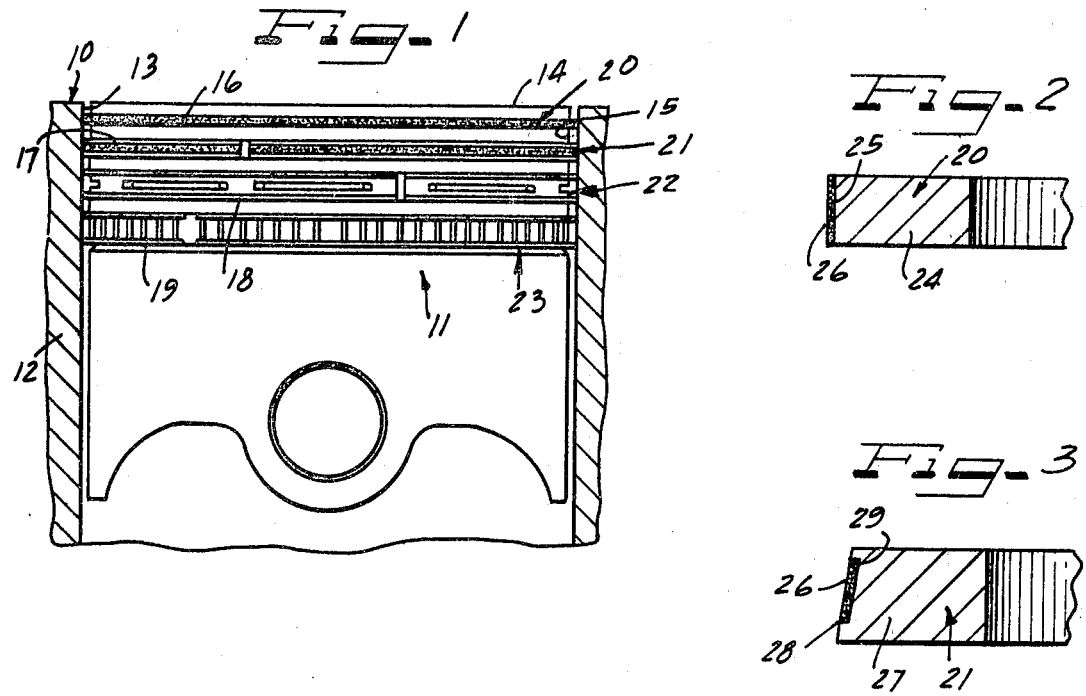
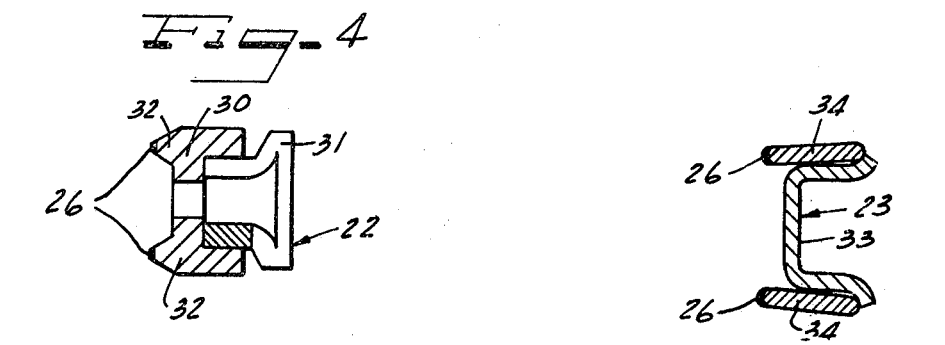
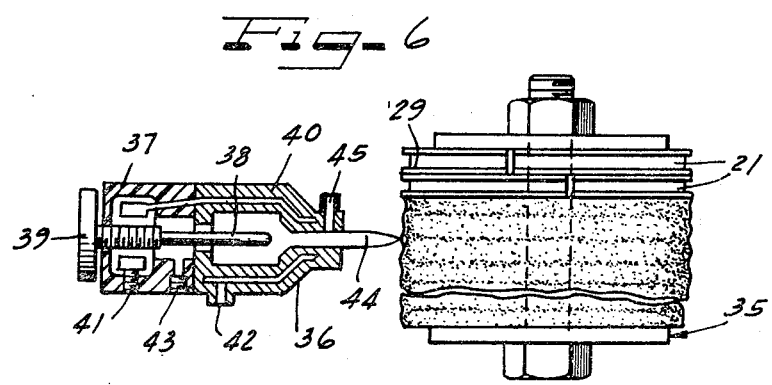

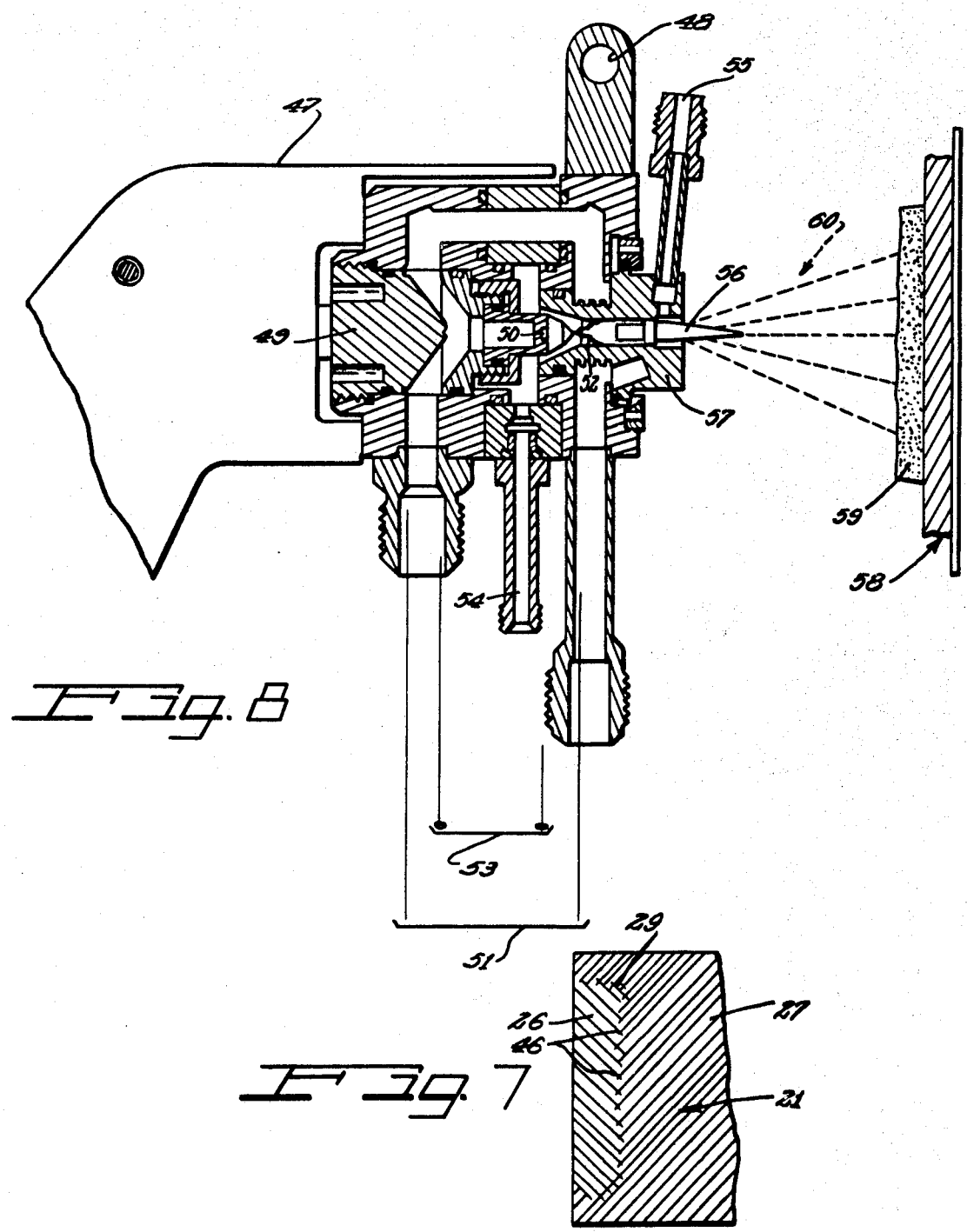

FERROUS METAL BODY COATED WITH AN ALLOY FORMED BY AN IRON/SILICON EXTENDED MOLYBDENUM PLASMA SPRAY POWDER

This is a continuation of application Ser. No. 879,477, filed Feb. 21, 1978, now abandoned.

BACKGROUND OF THE INVENTION

The present invention relates to a powder either as a blend or as a composite which is particularly useful to produce by plasma spray technique, a bearing surface of high wear and scuff resistance. The present powder compositions are particularly useful in producing bearing surfaces on piston rings or apex seals in internal combustion engines, e.g. diesel engines or gasoline engines.

An alloy coating on a piston ring, or an apex seal in a rotary engine, encounters conditions not common to other bearing surfaces. Other bearing surfaces, e.g. crankshaft main and crank/rod bearing surfaces, are subjected to a rather uniform temperature in an oil bath, but with contact surface pressure variations. A piston ring bearing surface on the other hand must withstand a wide variety of conditions. These include wide temperature variation, wide pressure variation, exposure to reactive chemical products of combustion, minimum lubrication as compared to crankshaft bearings, for example, exposure to abrasive foreign particles, etc. Hence, an alloy that may be suitable in one environment is not necessarily suitable in another. The piston ring is a primary example. Often, however, a material which is able to withstand successfully the numerous conditions imposed on a piston ring in an internal combustion engine, will withstand the conditions imposed by another environment not only in an internal combustion engine, but elsewhere.

In the past, sophisticated coatings as bearing surfaces have been developed ranging from hard metals (U.S. Pat. Nos. 3,539,192; 3,690,686; 3,725,017; 3,814,447) to refractory metal oxides (U.S. Pat. Nos. 3,697,091 and 3,794,334). Each has its particular advantage in a given environment either in terms of processing or final use. One particularly useful material based on molybdenum is that described and claimed in U.S. Pat. No. 3,690,686 and is today in widespread use on piston rings for internal combustion engines. Its principal problem is one of economics as the price of molybdenum has risen as much as 20% in the last three years. Consequently, the initial powder cost is very high. About one-half of the plasma applied material is ground off in finishing piston rings coated in accordance with U.S. Pat. No. 3,690,686, and although there are reclaim values in the resulting sludge, the cost difference is also high. There is need, therefore, for a less expensive substitute for the high cost, high molybdenum content coatings.

Alloy bearing surfaces composed of molybdenum together with a substantial amount of iron and applied by plasma spray techniques are not broadly new. Reference may be had, for example, to the patent to Ingham U.S. Pat. No. 3,819,384 wherein a powder containing from 50 to 75% molybdenum and 50 to 25% of iron is taught as useful for the coating of piston ring surfaces. Also U.S. Pat. No. 3,991,240 teaches the provision of bearing surfaces formed from a flame spray powder including cast iron, molybdenum and boron. German Pat. No. 2,456,238 also teaches a composition formed from a powder containing iron, molybdenum and boron.

Iron, molybdenum and silicon containing systems as alloys are old, and in such systems a relatively wide range of silicon concentrations is known. Howardton, U.S. Pat. No. 2,383,969 teaches a permanent magnet containing 70% iron, 17% molybdenum and 0.1% silicon. Holtz, U.S. Pat. No. 3,655,365 teaches a tool alloy of 20–48% iron, 25–50% cobalt, 10–40% molybdenum, 0.5–4% carbon and a minor amount of silicon. The alloy is formed by the hot consolidation of three alloyed powders. Iwata U.S. Pat. No. 3,856,478 shows a valve seat alloy composed of 10–12% molybdenum, 88–90% iron and 0.05–20% silicon.

Slightly higher concentrations of silicon are shown in Flanders U.S. Pat. No. 2,124,877 for a hard tool alloy. The concentration of molybdenum is from 4.5–10%, silicon from 0.2–1.25%, and the balance iron. The presence of carbon, sulfur, phosphorus and manganese is also shown. Other references showing alloys with intermediate concentrations of silicon, include Wissler U.S. Pat. Nos. 2,219,462 and Scott 2,354,147.

Higher concentrations of silicon in alloys are shown in Yurasko U.S. Pat. No. 3,428,442. This composition contains a relatively small amount of molybdenum, i.e. 0.0–5.0%. Dechtold U.S. Pat. No. 3,161,948 teaches a low melting composition including iron and molybdenum along with silicon in the amount of from 5–25% by weight. Jerabek, U.S. Pat. No. 2,289,365 teaches a phosphorus, silicon, iron alloy which may contain molybdenum in amounts up to 35% by weight. The phosphorus/silicon is present to a maximum of 26% with the phosphorus ranging from 2–13% and the silicon from 6–22%. The balance is iron. German Pat. No. 2,433,814 also teaches an iron, molybdenum, silicon composition with 45% or less iron.

No prior art is known showing a powder blend or composite for plasma spray application to form a bearing surface which comprises 70–87% iron, 10–25% molybdenum, 0.5–6% silicon, 0.0–4% carbon and optionally, an organic binder in the amount of 0.0–2 5%, total 100%.

The present invention provides such a composition. A relatively small amount of the high cost molybdenum is used in combination with a mixture of iron and a small amount of silicon, optionally along with a small amount of carbon. Thus it has been found that in a piston ring or apex seal coating, iron can be used in combination with a small amount of silicon as an inexpensive extender for high cost molybdenum without substantial sacrifice of the properties of the high concentration molybdenum coatings.

BRIEF STATEMENT OF THE INVENTION

Briefly stated, therefore, the present invention is in a blended powder mixture of powdered molybdenum extended with an extender mixture comprising mainly powdered iron and a small amount of powdered silicon. The extender may be incorporated in the spray powder either as a blend, or as a composite utilizing an organic or inorganic binder.

The extender mixture is a blend of from 98.5% to 99.5% by weight powdered iron, balance powdered silicon. This extender may desirably contain carbon to the extent of from 0 to 4 parts per hundred parts of the iron/silicon extender. The powdered molybdenum is extended by blending in from 790 to 900 parts by weight of the extender with 100 parts of molybdenum, or as indicated above by a binder. Prealloys of iron and molybdenum containing from 50% to 75% molybdenum, balance iron (trace impurities) may be used so long as the ultimate elemental analysis of the powder is within the composition ranges state herein. Manganese up to the extent of about 4 parts per 100 of molybdenum and organic material up to the extent of about 25 parts per hundred parts of molybdenum may also be present, if desired.

When this composition is applied by plasma jet spray techniques to an iron substrate and ground to a smooth fine finish with a fine silicon carbide (vitrified) wheel, there is obtained a highly satisfactory bearing surface especially suitable for use in an internal combustion engine as a bearing surface for piston rings or apex seals.

BRIEF DESCRIPTION OF THE DRAWINGS

The invention may be better understood by having reference to the annexed drawings wherein:

FIG. 1 is a side elevational view, with parts in cross section, of an engine piston ring cylinder assembly wherein the piston has ring grooves equipped with compression and oil control rings, each having a bearing face engaging the cylinder wall, which bearing face is composed of an in situ formed plasma jet applied iron extended molybdenum alloy according to this invention.

FIG. 2 is an enlarged fragmentary cross sectional view of the top compression ring of FIG. 1.

FIG. 3 is a view similar to FIG. 2 but illustrating the second compression ring in the piston of FIG. 1.

FIG. 4 is a view similar to FIG. 2, but illustrating the oil control ring in the third ring groove of the piston of FIG. 1.

FIG. 5 is a view similar to FIG. 2 but illustrating the oil control ring in the fourth ring groove of the piston of FIG. 1.

FIG. 6 is a diagrammatic cross sectional view of a plasma flame spray gun typically used to coat a cast iron base material according to the method of the present invention.

FIG. 7 is an enlarged fragmentary sectional view taken through an interface between an alloy matrix filling a groove and the cast iron base body of a work piece.

FIG. 8 is a cross sectional view of a plasma jet spray gun for applying the hard faced surface to a piston ring or other work piece.

DETAILED DESCRIPTION OF THE DRAWINGS

Referring now more specifically to FIG. 1, the piston and cylinder assembly 10 of FIG. 1 includes generally a conventional four-ring groove internal combustion engine piston for operating in an engine cylinder. The assembly 10 includes a piston 11 and an engine cylinder 12 with a bore 13 receiving the piston 11. The piston 11 has a head 14 with the ring band 15 having four peripheral ring grooves 16, 17, 18 and 19 therearound. The top ring groove 16 has a split solid cast iron compression or fire piston ring 20 therein. The second ring groove 17 has a split solid second compression ring 21 somewhat wider than the ring 20. The third ring groove 18 carries a two piece oil control ring assembly 22. The fourth or bottom ring groove 19 carries a three piece oil control ring assembly 23. Both the cast iron piston rings and the steel oil control rings may be provided with bearing surfaces in accordance herewith.

As shown in FIG. 2, the top compression or fire ring 20 has a main body 24 composed of cast iron, preferably gray iron, with a carbon content of about 3.5% by weight. The outer periphery 25 of this ring is covered with a plasma jet applied alloy matrix coating 26 formed from the alloy producing powders of the present invention.

As shown in FIG. 3, the second compression ring 21 has a main body 27 composed of the same type of cast iron as the body 24 of the ring 20. The outer periphery 28 of the body 27 is inclined upwardly and inwardly from the bottom edge of the ring and a peripheral groove 29 is formed around this inclined periphery. The groove 29 is filled with an alloy matrix 26.

As shown in FIG. 4, the oil control ring assembly 22 in the third ring groove 18 is composed of a one piece flexible channel ring 30 and a sheet metal expander ring 31, having legs extending into the channel for expanding the ring 30. The ring and the expander are more fully described in Mayhew et al U.S. Pat. No. 3,281,156.

The one piece oil control ring 30 has a pair of axially spaced radially projecting beads 32. The peripheries of these beads 32 are coated with the coating 26.

In FIG. 5, the oil control ring assembly 23 includes a resilient spacer-expander ring 33 supporting an expanding split thin rail ring 34. The assembly 33 is of the type disclosed in the Marion U.S. Pat. No. 2,817,564. The outer peripheries of the oil rings 34 are coated with the alloy matrix coating 26 according to this invention.

From the above description, it will be understood that the bearing faces of each of the compression and oil control rings 20, 21, 22 and 23 are coated with the alloy matrix coating 26 containing a molybdenum-iron-silicon phase in accordance with the present invention. The thus coated bearing faces 26 ride on and sealingly engage the wall of the bore 13 of the engine cylinder 12. The piston rings 20, 21, 22 and 23 are compressed in the bore 13 so as to expand tightly against the bore wall and maintain a good sealing, sliding engagement therewith with acceptable wear and scuff characteristics.

As shown in FIG. 6, the alloy matrix forming the coating or facings 26 is applied on the rings as for example, on the groove rings 21, by stacking a plurality of the rings on an arbor 35 with the rings compressed so that their split ends will be nearly in abutment. The arbor clamping the stack of rings in their closed, contracted position, may be mounted in the lathe and the peripheries of the rings machined to form the grooves 29 therearound. The outer peripheries of the rings 21 on the arbor are then coated using a plasma jet spray gun 36 and the improved powder compositions hereof. The gun 36 includes an insulated casing such as nylon 37, from which projects a rear electrode 38, the projection of which is adjustably controlled by a screw knob 39. The front face of the casing receives a front electrode 40. The casing 37 and the electrode 40 are hollow and water jacketed so that the coolant may circulate therethrough from an inlet 41 to an outlet 42. Plasma jet gas of conventional composition is fed through an inlet 43 into the chamber provided by the casing 37, and the electrode 40 to flow around the electrode 38.

The front end of the electrode 40 provides a nozzle outlet 44 for the plasma flame and the ingredients to form the alloy of the coating 26 are fed to this nozzle through a powder inlet 45, just in advance of the discharge outlet of the nozzle.

A plasma composed of ionized gas is produced by passing the plasma gas from the inlet 43 through an electric arc established between the electrodes 38 and 40. This plasma gas is non-oxidizing and is composed of nitrogen or argon in combination with hydrogen. The plasma flame exuting from the nozzle 44 draws the alloy-forming powder therewith by aspiration and subjects the powder ingredients to such high temperatures as to cause them to alloy together. The spray powder is usually suspended in a carrier gas. The jet stream carries the alloy into the bottom of the groove 29 of each piston ring to fill the groove.

The preferred powder fed to the powder inlet 45 of the gun 36 is composed of molybdenum which has been extended by an iron/silicon/ extender which may optionally include a small amount of carbon, and/or organic binder and/or manganese in the proportions indicated above.

The alloy 26 as illustrated in FIG. 7 is actually formed in situ in the groove 29 and is bonded to the base body 27 of the ring along a diffused interface or welded zone 26. This interface or zone 46 is composed of the materials of the alloy 26 and the material of the ring body 27 usually cast gray iron.

During the plasma jet spray application, it is desired to maintain a temperature in the groove 29 such that excessive melting and burning away of the body metal 27 will be prevented, but the wetting of the surface by the alloy will not be substantially inhibited. To the accomplishment of this, the arbor of rings is preferably cooled with an external blast of inert gas impinging on both sides of the jet flame. It is desired to keep the temperature of the rings 21 in the arbor around 400° F. or less. It is not necessary to provide any subsequent heat treatment for the plasma jet coated rings other than allowing the rings to cool spontaneously in air.

The powder fed to the inlet 45 is metered preferably with the aid of an aspirating gas, vibration, mechanical gearing, etc. All of the powder is completely melted and penetrates into the center cone of the plasma jet flame.

The provision of the alloy coatings 26 in a groove to form a band around the periphery of the piston 21, for example, utilizes the body metal of the ring as a land alongside of the groove to form an initial quick break in surface for the ring as described in the aforesaid Marion U.S. Pat. No. 3,133,739. The inclined periphery of the ring 21 may be formed by grinding with a silicon carbide grinding wheel or by torsional twisting of the ring in use in the ring groove as described in the Marion patent.

The operation of plasma gas jet spraying is perhaps better illustrated by reference to FIG. 8 showing a spray gun of this type and its mode of operation. Shown is spray gun 47 which may be fixed for mounting at 48. Also shown is electrode holder 49 and electrode 50. The gun is cooled by circulated coolant coming from a source 51. The arc 52 is created by a power source 53. Plasma gas fed in at location 54, the gas being a combination of nitrogen or argon with hydrogen to prevent excessive oxidation. The spray powder suspended in carrier gas, enters at opening 55 and is fed into the area of plasma flame 56 in the nozzle 57. The plasma flame, of course, is created by ionization and combustion of the plasma gas. Also shown is a prepared base material for work piece 58 upon which is coated a sprayed facing material 59 by means of spray screen 60. As previously noted, the gun is moved relative to the base material back and forth to build up a plurality of layers constituting the entire final coating. In the case of the mandrel 35, the gun is held stationary and the mandrel rotated.

The extenders of the present invention may be prealloyed and then powdered by conventional means. Thus iron and silicon may be fused at alloying temperatures, cooled and powdered to yield a ferrosilicon having the respective elements in the proportions illustrated below for the unalloyed elements. Also, as indicated above, part or all of the iron may be prealloyed with the molybdenum and then powdered prior to plasma spray application with or without the silicon present during the prealloying operation. It is preferred, however, to blend the elemental powders according to the percentage ranges described herein and illustrated in the specific examples.

As indicated, binders are used in formulating composites as distinct from blends. As a binder there may be used a conventional phenolic varnish. Other examples of organic binders useful herein are known epoxy or oil modified alkyd varnishes, drying oils, e.g. linseed oil varnish, tung oil, natural or synthetic rubber as a solution in a solvent, or as a latex, etc. Organic resins of various kinds which dry or harden by solvent evaporation or by chemical or thermal curing may be used. The nature of the organic binder is immaterial as long as it will set in some way to preserve a predetermined unalloyed analysis in substantially all of the powder to be sprayed. Whatever the organic binder is, it is destroyed in the plasma flame and does not become a part of the resulting alloy.

The following examples illustrate typical powder compositions of the invention in order to achieve the hard faced iron/silicon extended molybdenum alloy surfaces. It is understood, of course, that these examples are merely illustrative and that the invention is not to be limited thereto.

EXAMPLE I

A typical extender composition in accordance with the present invention has the following formulation:
Powdered iron (−170 mesh): 97%
Powdered silicon (−170 mesh): 1%
Powdered carbon (−170 mesh): 2%

EXAMPLE II

Another extender composition in accordance with the present invention has the following formulation:
Powdered iron (−170 mesh): 98.5%
Powdered silicon (−170 mesh): 1.5%

EXAMPLE III

Another extender composition in accordance with the present invention has the following formulation:
Powdered iron (−170 mesh): 96%
Powdered silicon (−170 mesh): 0.5%
Powdered carbon (−170 mesh): 3.5%

EXAMPLE IV

Another extender composition containing manganese in accordance with the present inention has the following formulation:
Powdered iron (−170 mesh): 94.2%
Powdered silicon (−170 mesh): 1.0%
Powdered manganese (−170 mesh): 2.4%
Powdered carbon (−170 mesh): 2.4%

EXAMPLE V

A preferred extender composition in accordance with the present invention has the following formulation:
Powdered iron (−170 mesh): 95.0%
Powdered silicon (−170 mesh): 1.0%
Powdered carbon (−170 mesh): 2.9%
Powdered manganese (−170 mesh): 0.2%
Powdered organic (−170 mesh): 0.9%

Many variations of the above extender compositions will now become evident to those skilled in the art. These extenders are blended with powdered molybdenum (−170 mesh) by known blending apparatus and method to produce as nearly uniform a blend of the powders as reasonably possible. While the particle size of the powders has been indicated as −170 mesh, which as used herein means that at least 95% of the powder will pass through a 170 mesh U.S. standard screen, it is desired that a minimum of 20% shall pass through a 325 mesh screen. The powders should be otherwise free of foreign matter. In general, the particles of metal are smaller than 20 microns and greater than 0.1 micron.

EXAMPLE VI

A typical example of a powder composition for plasma spray application to a cast iron piston ring or apex seal in accordance with this invention has the following formulation:
Powdered Molybdenum (−170 mesh): 10%
Extender of Example I: 90%

EXAMPLE VII

Another powder composition in accordance with this invention for plasma spray application to a cast iron piston ring or apex seal in accordance herewith has the following formulation:
Powdered Molybdenum (−170 mesh): 23.8%
Extender of Example I: 76.2%

EXAMPLE VIII

Another powder composition in accordance with this invention for plasma spray application to a cast iron piston ring, or apex seal has the following formulation:
Powdered Molybdenum (−170 mesh): 21%
Extender of Example II: 79%

EXAMPLE IX

Another powder composition in accordance with this invention for plasma spray application to a cast iron piston ring, or apex seal has the following formulation:
Powdered Molybdenum (−170 mesh): 14.3%
Extender of Example III: 85.7%

EXAMPLE X

Another powder composition in accordance with this invention for plasma spray application to a cast iron piston ring or apex seal has the following formulation:
Powdered Molybdenum (−170 mesh): 14.3%
Extender of Example IV: 85.7%

EXAMPLE XI

The best known powder composite composition in accordance with this invention for plasma spray application to a cast iron piston ring or apex seal has the following formulation:
Powdered Molybdenum (−170 mesh*): 15%
Extender of Example V (−170 mesh*): 85%
*At least 20% is −325 mesh.

EXAMPLE XII

Another powder composite composition in accordance with this invention for plasma spray application to cast iron to form when ground a bearing surface has the following formulation:
Powdered Molybdenum (−170 mesh): 25%
Extender of Example V: 75%

EXAMPLE XIV

Another powder composite composition in accordance with this invention for plasma spray application to cast iron to form when ground a bearing surface has the following formulation:
Powdered Molybdenum (−170 mesh): 10.0%
Extender of Example V: 90.0%

EXAMPLE XV

Another powder composite composition in accordance with this invention for plasma spray application to cast iron to form when ground a bearing surface has the following formulation:
Powdered Molybdenum (−170 mesh): 16.5%
Extender of Example V: 83.5%

Where a binder is used, the prevalent component, iron, may be considered as clad or coated with a coating containing a binder and the molybdenum and silicon components, in unalloyed or prealloyed condition.

In the foregoing compositions, other ingredients in amounts which do not adversely affect the alloys on the bearing surfaces may be present. These are usually found as impurities, e.g. phosphorus, arsenic, selenium, etc. The silicon in the foregoing compositions may be replaced in whole or in part with sulphur.

The preferred powders for plasma spray application in accordance herewith are characterized by an unusually high iron concentration relative to the molybdenum content for this type of application. The presence of silicon with or without carbon (preferably with) aids in scuff resistance. In general, it will be found that the weight ratio in the foregoing examples of iron to molybdenum is in the range of from 9:1 to 3.2:1 and that the iron and molybdenum together constitute from 90% to 99% by weight of the powder. Silicon is present in the range of from 0.4% to 6% by weight of the powder.

For convenience, the plasma spray powders of Examples VI through XV above will be found to have an analysis generally in accordance with the following:
Molybdenum: 10% to 25% by weight
Iron: 87.6% to 70.0% by weight
Silicon: 0.4% to 6.0% by weight
Manganese: 0.0% to 0.4% by weight
Carbon: 2.0% to 4.0% by weight
Organic: 0.0% to 2.5% by weight It should be understood that the powdered elements above mentioned are seldom available in the pure state at reasonable prices. Consequently, while powders of reagent grade purity may be used, if one wishes to endure their cost, powders of commercially available grades including trace amounts of normally present impurities, e.g. silicon, nickel, cobalt, chromium, aluminum, carbon, etc. may be used with very satisfactory results.

Plasma spray parameters which may be used are those which are known in the art, for example, those given in U.S. Pat. No. 3,819,384. A suitable set of plasma spray parameters and limits are as follows:

TABLE I

| Metco Gun Type 3MB | |
| --- | --- |
| Nozzle | G |
| Powder part | #2 |
| Primary Nitrogen | at 50 psig 100 Std. Cubic feet/ minute |
| Secondary H$_2$ | at 50 psig 15 SCFM |
| Amps | 500 |
| Voltage | 70–75 |
| Carrier Flow | 37 SCFM |
| Powder feed rate | 10 lbs./hr. |
| Gun to work distance | 3.7" to 4.5" |
| Back pressure | 40 psig |
| RPM (piston rings) | 19 |
| Vernier Setting | 44 |

When applying a coating directly to a cast iron substrate, e.g. a compression type piston ring, the substrate is desirably although not essentially, preheated to a temperature of from 200° F. to 450° F.

What is claimed is:

1. A piston ring having a ferrous metal body and a coating forming the bearing surface thereof which coating is a plasma jet sprayed alloy formed from a plasma spray feed powder mixture consisting essentially of molybdenum, iron and silicon, the weight ratio of iron to molybdenum in said powder being in the range of from 9:1 to 3.2:1, said iron and molybdenum constituting from 90% to 99% by weight of said powder, and the silicon being present in the range of from about 0.4% to 6.0% by weight of said powder, said powder having a particle size such that at least 95% passes through a 170 mesh screen.

2. The piston ring as described in claim 1 in which said plasma spray feed powder mixture further includes 0 to about 3.5% by weight powdered carbon.

3. The piston ring as described in claim 1 in which said plasma spray feed powder mixture further include 0 to about 2.4% by weight powdered manganese.

* * * * *